United States Patent
Posti et al.

(10) Patent No.: US 8,351,884 B2
(45) Date of Patent: Jan. 8, 2013

(54) DIVERSITY RECEPTION IN RADIO RECEIVER

(75) Inventors: Harri Posti, Oulu (FI); Risto Timisjärvi, Jääli (FI)

(73) Assignee: Nokia Corporation, Espoo (FI)

( * ) Notice: Subject to any disclaimer, the term of this patent is extended or adjusted under 35 U.S.C. 154(b) by 1300 days.

(21) Appl. No.: 12/010,830

(22) Filed: Jan. 30, 2008

(65) Prior Publication Data

US 2009/0111406 A1   Apr. 30, 2009

(30) Foreign Application Priority Data

Oct. 30, 2007   (FI) ...................................... 20075764

(51) Int. Cl.
*H04B 1/18*   (2006.01)

(52) U.S. Cl. .................. 455/150.1; 455/136; 455/277.2; 455/280

(58) Field of Classification Search .......... 455/133–136, 455/150.1, 277.1, 277.2, 280
See application file for complete search history.

(56) References Cited

U.S. PATENT DOCUMENTS

| | | | |
|---|---|---|---|
| 6,574,489 B1 * | 6/2003 | Uriya | 455/567 |
| 7,676,202 B2 * | 3/2010 | Anton-Becker | 455/133 |
| 2003/0190924 A1 | 10/2003 | Agashe et al. | |
| 2004/0253955 A1 * | 12/2004 | Love et al. | 455/442 |
| 2005/0197080 A1 | 9/2005 | Ulupinar et al. | |
| 2006/0276130 A1 | 12/2006 | Waxman | |
| 2007/0195745 A1 * | 8/2007 | Mizuki et al. | 370/338 |
| 2008/0080418 A1 * | 4/2008 | Rofougaran | 370/329 |
| 2008/0151802 A1 * | 6/2008 | Sheu et al. | 370/311 |

FOREIGN PATENT DOCUMENTS

| | | |
|---|---|---|
| CN | 1883134 | 12/2006 |
| JP | 6 188790 | 7/1994 |
| WO | 2005/002084 | 1/2005 |

OTHER PUBLICATIONS

International Search Report PCT/FI2008/050600 dated Feb. 12, 2009.
Chinese Office Action, dated Aug. 15, 2012; Issued on Chinese Application No. 200880114041.6.

* cited by examiner

*Primary Examiner* — Nhan Le
(74) *Attorney, Agent, or Firm* — Squire Sanders (US) LLP

(57) ABSTRACT

A method, apparatus, and computer program for controlling diversity reception in a radio receiver are provided. The radio receiver is configured to either activate or disable the diversity reception according to an application type of an application requesting transfer of data.

24 Claims, 3 Drawing Sheets

DIVERSITY RECEPTION IN RADIO RECEIVER

FIELD

The invention relates to the field of radio telecommunications and, particularly, to diversity reception in radio receivers.

BACKGROUND

Many radio telecommunication systems utilize diversity reception to facilitate reliable detection of received radio signals in radio receivers. There are numerous alternative solutions for implementing the diversity reception in the radio receiver. The radio receiver may be configured to utilize at least one of the following diversity reception schemes: spatial diversity, polarization diversity, etc. Generally in the diversity reception, radio signals traveling through a plurality of separate signal paths to the radio receiver are received at separate reception branches in the radio receiver and processed in order to acquire payload data from the received radio signals. Each reception branch may include separate receiver components, and the power consumption of the radio receiver is typically increased upon activation of the diversity reception. This may not be a critical factor in radio receivers connected to a mains power supply, but it may be crucial in portable radio receivers relying on battery power supply. Therefore, there is a need for providing an intelligent control mechanism for diversity reception so as to employ the benefits of the diversity reception while keeping the power consumption of the radio receiver at a tolerable level.

BRIEF DESCRIPTION

According to an aspect of the present invention, there is provided a method that includes determining whether an application type of an application requesting for transfer of data is a real-time application or a non-real-time application, and configuring a radio receiver to activate the diversity reception if the application type is determined to be the non-real-time application and to disable the diversity reception if the application type is determined to be the real-time application.

According to another aspect of the present invention, there is provided an apparatus that includes at least one processor and at least one memory including computer program code. The at least one memory and the computer program code configured, with the at least one processor, to cause the apparatus to determine whether an application type of an application requesting for transfer of data is a real-time application or a non-real-time application, to control a radio receiver to activate the diversity reception if the application type is determined to be the non-real-time application, and to disable the diversity reception if the application type is determined tp be the real-time application.

According to another aspect of the present invention, there is provided an apparatus that includes means for determining whether an application type of an application requesting for transfer of data is a real-time application or a non-real-time application, and means for configuring a radio receiver to activate the diversity reception if the application type is determined to be the non-real-time application and to disable the diversity reception if the application type is determined to be the real-time application.

According to yet another aspect of the present invention, there is provided a computer program product embodied on a computer readable distribution medium.

Embodiments of the invention are defined in the dependent claims.

LIST OF DRAWINGS

Embodiments of the present invention are described below, by way of example only, with reference to the accompanying drawings, in which FIG. 1 illustrates communication between a mobile terminal and a mobile telecommunication system;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
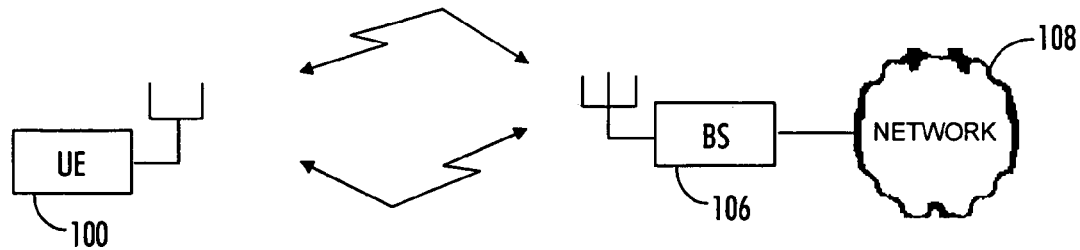

A general architecture of a mobile telecommunication system providing data transfer services to a mobile terminal having a communication connection with the system is illustrated in FIG. 1. FIG. 1 is a simplified system architecture only showing some elements and functional entities, all being logical units whose implementation may vary according to specifications of different systems. The connections shown in FIG. 1 are logical connections, and the actual physical connections may be different. It is apparent to a person skilled in the art that the mobile telecommunication systems also comprise other functions and structures.

The mobile telecommunication system may be a mobile telecommunication system of any type, including UMTS (Universal Mobile Telecommunication System) and its evolution versions, WLAN (Wireless Local Area Network), broadcasting systems utilizing radio interface, etc. Embodiments described below may, however, be applied to other mobile telecommunication systems as well. The mobile telecommunication system comprises a base station 106 providing a wireless service to a mobile terminal 100 within a coverage area of the base station 106. The coverage area is typically referred to as a cell. The base station 106 may be further connected to other elements of a mobile telecommunication network 108 through a wired (or wireless) connection. The network 108 of the mobile telecommunication system may provide connections to other networks, such as the Internet, Public Switched Telephone Network (PSTN), and/or other mobile telecommunication systems.

The mobile terminal 100 may be a mobile communication device, such as a personal computer or a laptop (a notebook) provided with a wireless communication device capable of communicating with the mobile telecommunication system, a personal digital assistant, or a mobile phone. The mobile terminal 100 may also be another electronic device provided with communication capability with the mobile telecommunication system described above.

Figure 2:
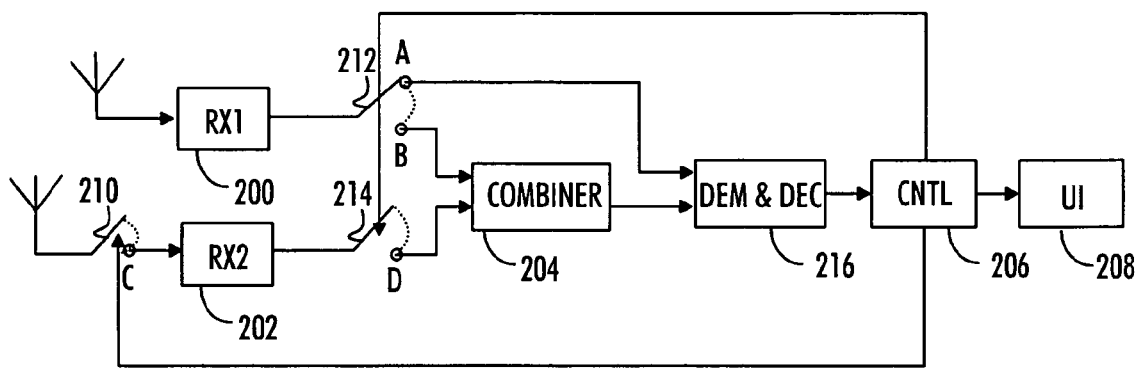
FIG. 2 illustrates receiver structure of a radio receiver according to an embodiment of the invention.

FIG. 2 illustrates a block diagram of a radio receiver according to an embodiment of the invention. The radio receiver illustrated in FIG. 2 may be the mobile terminal 100 illustrated in FIG. 1. The radio receiver may be configured to support diversity reception to facilitate reliable detection of received data. Preferably, the diversity reception is realized according to a diversity reception scheme in which the receiver may independently make the decision on whether to use the diversity reception or not. In other words, the diversity reception scheme may be a scheme not using additional radio resources for the diversity reception. Such diversity schemes include spatial diversity and polarization diversity. Naturally, other diversity schemes, e.g. time, frequency, macro, and cyclic diversity may also be used but these diversity schemes use additional radio resources to enable the diversity reception. The diversity reception may be controlled according to a determined criterion to ensure efficient utilization of the diversity reception. In more detail, the diversity reception may be activated or disabled in a controlled manner.

The radio receiver may include a plurality of reception diversity branches, each comprising a separate reception circuitry. In this example, two reception branches are described, but the radio receiver may employ an arbitrary number of diversity reception branches. In typical implementations, the number of diversity reception branches in the radio receiver supporting diversity reception is between 2 to 4, because additional diversity reception branches may not provide additional gain to data detection. With reference to FIG. 2, a radio signal received through a first antenna is conveyed to a first reception branch including a first reception circuit 200. The radio signal may also be received through a second antenna and coupled selectively to a second reception circuit 202, as described below. The first reception circuit 200 and second reception circuit 202 may include components necessary for converting the received radio signal into a digital baseband signal. Such components may include filters, amplifiers, one or more frequency converters, an analog-to-digital (A/D) converter, etc.

If the received radio signal is conveyed only to the first reception branch, the diversity reception is currently disabled in the radio receiver. In such a case, the digital baseband signal is output from the first reception circuit 200 to a demodulator and decoder unit 216 for data demodulation, detection, decoding, and other signal processing operations. The demodulator and decoder unit 216 may output decoded data bits to a control unit 206 for extraction of application data. The control unit 206 may be implemented by a digital signal processor with suitable software embedded in a computer readable medium, or by separate logic circuits, for example with ASIC (Application Specific Integrated Circuit). Other hardware embodiments are also feasible, such as a circuit built of separate logic components. A hybrid of these different implementations is also a feasible solution. When selecting the method of implementation, a person skilled in the art will consider the requirements set for the size and power consumption of the control unit 206 and the radio receiver utilizing the control unit 206, necessary processing capacity, production costs, and production volumes, for example.

If the diversity reception is enabled, the radio signals received through both first and second antenna are conveyed from the antennae to respective reception branches of the radio receiver, i.e. from the first antenna to the first reception circuit 200 and from the second antenna to the second reception circuit 202. The radio receiver may include a plurality of antenna elements, and a radio signal received through different antenna elements may be applied to different reception circuits. In this example, the radio receiver may include a first and a second antenna, and a radio signal received through the first antenna may be conveyed to the first reception circuit 200, and a radio signal received through the second antenna may be conveyed to the second reception circuit 202.

As mentioned above, the second reception circuit 202 may include components similar to those of the first reception circuit 200. The configuration of the first and the second reception circuit 200 and 202 may, however, differ from each other, depending on the diversity type used in the reception. In case of frequency diversity, for example, the first reception circuit 200 and the second reception circuit may be configured to receive the radio signal on different frequency bands. It should be noted that in case of frequency or time diversity, the radio receiver may include only a single antenna. In the case of diversity reception, the outputs of the first and second reception circuits 200 and 202 are applied to a combiner 204 configured to combine signals received from the reception circuits 200 and 202. The combiner 204 may utilize any diversity combining scheme known in the art, such as maximal ratio combining, selection combining, equal-gain combining, switched combining, etc. The combined signal is then applied to the demodulator and decoder unit 216 for data demodulation, detection, and decoding. The demodulator and decoder unit 216 outputs the decoded data bits to the control unit 206 for further processing.

The diversity reception may be controlled by the control unit 206, which may also control other functions and general operation of the radio receiver. The control unit 206 may control switches 210, 212, and 214 to either activate or disable the diversity reception. A first switch 210 may be provided at an input of the second reception circuit 202, a second switch 212 may be provided at the output of the first reception circuit 200, and a third switch 214 may be provided at the output of the second reception circuit 202. To be exact, the second switch 212 may be provided between the output of the first reception circuit 200 and the input of the combiner 204, while the third switch 214 may be provided between the output of the second reception circuit 202 and the input of the combiner 204.

The control unit 206 may open the first switch 210 and the third switch 214 so as to disable the diversity reception. Accordingly, the second reception circuit 202 is disconnected from the reception chain. Furthermore, the control unit 206 may control the second switch 212 to connect the output of the first reception circuit 200 to port A of the second switch 212, that is to the input of the demodulator and decoder unit 216.

In order to activate the diversity reception, the control unit 206 may close the first switch 210 and the third switch 214. In more detail, the control unit 206 may control the first switch 210 to connect the antenna to port C of the first switch 210 coupled to the input of the second reception circuit 202. Similarly, the control unit 206 may control the third switch 214 to connect the output of the second reception circuit 202 to port D of the third switch 214 coupled to the input of the combiner 204. Furthermore, the control unit 206 may control the second switch 212 to connect the input of the second switch to port B, i.e. to couple the output of the first reception circuit 200 to the input of the combiner 204.

Instead of using the first and third switches 210 and 214, the control unit 206 may apply to the second reception circuit 202 a control signal shutting down or powering up the second reception circuit 202. Then, the first switch 210 and the third switch 214 may be omitted.

When the diversity reception is disabled, the demodulator and decoder unit 216 receives a digital baseband received signal from the first reception circuit 200, detects and decodes the received signal, and outputs the decoded data bits to the control unit 206. The control unit 206 extracts application data from the decoded signal. The application data may relate to an application executed in the radio receiver, and the application may require data transfer services provided by the mobile telecommunication system serving the radio receiver. Such applications include voice communication applications, e-mail, multimedia applications including multimedia broadcast and streaming applications, Internet browsing applications, etc. Then, the control unit 206 may present the received application data to a user of the radio receiver through a user interface 208 provided in the radio receiver. The user interface 208 may include a display unit, loudspeaker, one or more input devices, etc.

When the diversity reception is activated, the combiner 204 combines the digital baseband signals output from the first and second reception circuit 200 and 202 and outputs the combined signal to the demodulator and decoder unit 216 for demodulation, detection, and decoding of the combined signal, while the control unit 206 carries out the extraction and presentation of the application data.

Figure 3:
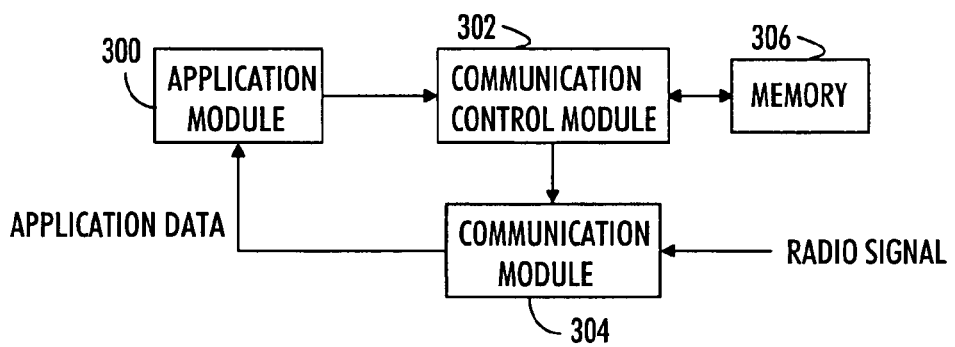
FIG. 3 illustrates a functional block diagram related to diversity reception in a radio receiver according to an embodiment of the invention.

FIG. 3 illustrates a functional block diagram related to diversity reception in the radio receiver of FIG. 2. At least some of the blocks illustrated in FIG. 3 may be software modules controlling the operation of the control unit 206, and the operation of the modules will be described next.

Figure 4:
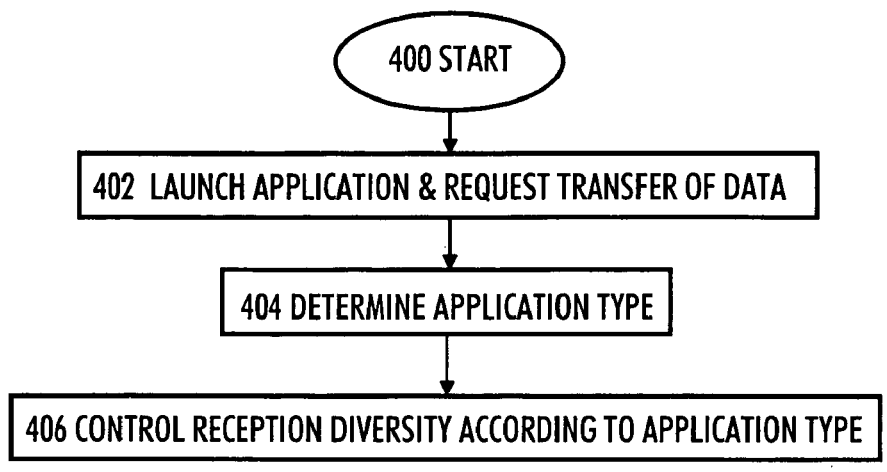
FIG. 4 is a flow diagram illustrating an embodiment of a process for controlling diversity reception according to an embodiment of the invention.

FIG. 4 illustrates a flow diagram describing a basic process of controlling diversity reception according to an embodiment of the invention. The process starts in block 400. According to the embodiment of the invention, the control unit 206 configures the radio receiver either activate or disable diversity reception according to an application type of an application requesting transfer of data. Referring to FIGS. 3 and 4, an application module 300 launches an application which requires communication capability of the radio receiver (402). Accordingly, the application module 300 may apply a data transfer request to a communication control module 302. The communication control module 302 may be configured to determine the application type of the application requesting the data transfer (404) and control a communication module 304 to either activate or disable diversity reception according to the determined application type (406) when receiving data related to said application. The communication module 304 may include the first and second reception circuit 200 and 202, combiner 204, but also detection and decoding portions of the control unit 206. In other words, the communication module 304 may be configured to process the received radio signal and extract the application data from the received radio signal.

In more detail, the communication control module 302 may identify the application and/or the application type of the application requesting the transfer of data and check whether the diversity reception should be used when receiving data related to said application. A memory unit 306 may store the information on the applications for which the diversity reception should be used, and the communication control module 302 may retrieve from the memory unit 306 said information for each application requesting the transfer of data. If the stored information indicates that the diversity reception should be used for the application, the communication control module 302 may activate the diversity reception by applying to the communication module 304 an appropriate control signal activating the diversity reception. Correspondingly, if the stored information indicates that the diversity reception should not be used for the application, the communication control module 302 may disable the diversity reception by applying to the communication module 304 an appropriate control signal disabling the diversity reception.

The application type may be defined in various manners. In an embodiment, the application type is divided into two subcategories: real-time applications and non-real-time applications. Real-time applications include applications having strict requirements for the delays in data transfer. That is, the real time applications are generally sensitive to large delays in the data transfer. Such applications include telephony and voice application, streaming multimedia applications, etc. For example, real-time applications often exhibit a constant bit rate and call duration which is independent of the bit rate. Non-real-time applications, however, often exhibit a specific amount of data, and a transmission time depends on the achievable date rate. Such applications include Internet-browsing, e-mail, etc.

Generally, real-time applications set determined boundaries for delays, and the mobile telecommunication system establishing a communication connection for such applications typically guarantees to meet these boundaries under normal circumstances. Therefore, additional gain obtained with the diversity reception does not necessarily provide any improvements in terms of reduced duration of the real-time connection and/or user experience but, in contrast, consumes battery in excess due to the utilization of multiple diversity branches including power-consuming components. Moreover, real-time applications typically require continuous data transfer. Therefore, diversity reception may be disabled for real-time applications in order to save battery.

On the contrary, utilization of the diversity reception in conjunction with non-real-time applications provides clear benefits and improvements in user experience. The utilization of the diversity reception is typically noted as improved data rate, because the diversity reception improves quality of received signals to be detected and, thus, decreases error rates. As a consequence, higher order modulation schemes and/or lower degree of error correction coding may be used in order to increase the data rate. The number of retransmissions resulting from erroneously received data packets is reduced. Accordingly, a given amount of data may be received and decoded more rapidly with the diversity reception than without it. In addition to improving user experience, power consumption may be reduced in some cases. For example, if a user of the radio receiver desires to download a file, Internet page, or e-mail message (non-real-time application), the item may be downloaded more rapidly with the diversity reception and, therefore, the data transfer lasts for a shorter time, and the reception circuitry, i.e. reception circuits 200 and 202, remains powered up for a shorter duration. In other words, the shorter active time period of the reception circuitry may very well more than compensate for the additional power consumption caused by the diversity reception. Therefore, diversity reception may be activated for non-real-time applications in order to improve user experience, provide higher data rates, and reduce power consumption.

Figure 5:
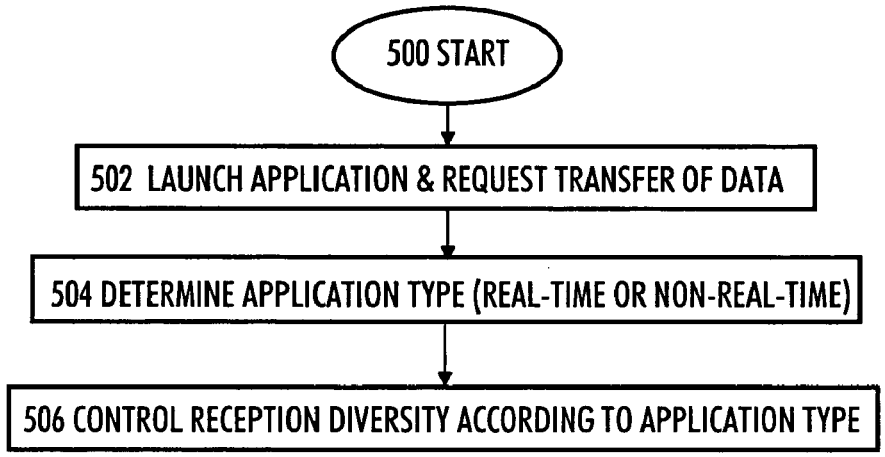
FIG. 5 is a flow diagram illustrating an embodiment of a process for controlling diversity reception according to another embodiment of the invention.

FIG. 5 illustrates a flow diagram describing a procedure of controlling the diversity reception according to this embodiment of the invention. The procedure starts in block 500.

Referring to FIGS. 3 and 5, the communication control module 302 may receive a data transfer request for a given application from the application module 300 launching an application in block 502. Then, the communication control module 302 may determine whether the application requesting the data transfer is a real-time application or a non-real-time application (504). This categorization may be stored in the memory unit 306, for example. Upon determining that, the communication control module 302 may control (506) the communication module 304 to activate the diversity reception if the application was determined to be the non-real-time application, and to disable the diversity reception if the application was determined to be the real-time application.

In another embodiment, the diversity reception is switched on/off according to the radio channel type used for the application requesting the transfer of data. The diversity reception may be disabled if the radio channel type used for the application is a radio communication channel for which there are defined maximum delay restrictions or guaranteed data rates satisfying the requirements of the application. This type of radio channels may include any type of channels carrying voice or streaming data, such as dedicated traffic channels, circuit-switched channels, broadcast traffic channels, e.g. channels used in Multimedia Broadcast Messaging Service (MBMS), etc. On the other hand, the diversity reception may be activated if the radio channel type used for the application is a communication channel for which there are no defined maximum delay restrictions or guaranteed data rates. This type of radio channel may include channels carrying packet data other than voice or streaming data, such as packet-switched channels, shared traffic channels, etc. This type of control of the diversity reception may be reasoned in the above-described manner. The memory unit 306 may store information on whether or not to use the diversity reception for each traffic channel supported by the radio receiver. When an application is launched and a traffic channel is allocated to the application, the communication control module may check the memory unit 306 for the information on whether or not to activate diversity reception for the allocated traffic channel, and either activate or not activate the diversity reception according to the stored information.

In a still another embodiment, the diversity reception is activated or disabled according to the stability of the data rate of a communication channel or connection assigned to a given application. The diversity reception may be disabled if the application uses a communication channel or connection having a fixed data rate. Such channels may include channels assigned for voice communications, video streaming, broadcasting, signaling, etc. On the other hand, the diversity reception may be activated if the application uses a communication channel or connection having a data rate variable according to a load in a radio access network of the mobile communication system, changing channel environment, etc. Such a channel may include channel assigned to Internet browsing, etc. The decision on whether a communication channel or connection has a fixed data rate or a variable data rate may be made according known properties of different channel or connection types.

Figure 6:
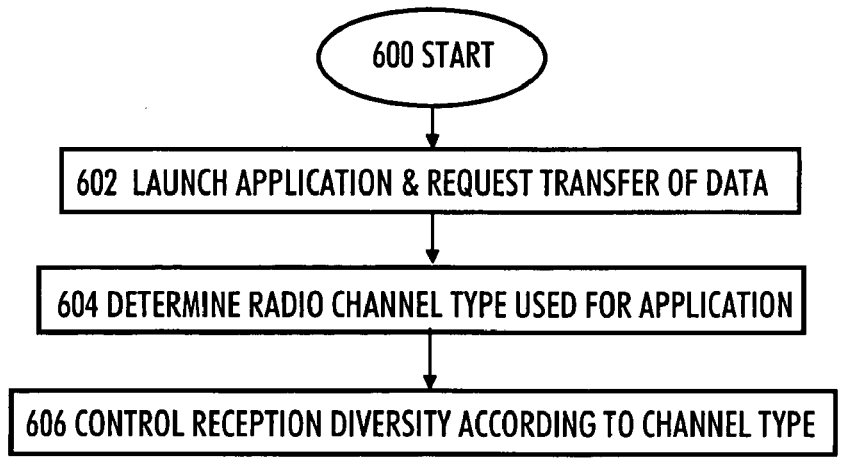
FIG. 6 is a flow diagram illustrating an embodiment of a process for controlling diversity reception according to yet another embodiment of the invention.

FIG. 6 illustrates a flow diagram describing a procedure of controlling the diversity reception according to this embodiment of the invention. The procedure starts in block 600.

Referring to FIGS. 3 and 6, the communication control module 302 may receive a data transfer request for a given application from the application module 300 launching an application in block 602. Then, the communication control module 302 may determine the radio channel type to be used for transferring data related to the application (604). Then, the communication control module 302 may determine whether or not to use the diversity reception for the application. The memory unit 306 may store information on whether or not to use diversity reception for each application and radio-channel-type pair, and the communication control module 302 may check the memory unit 306 for that information. Then, the communication control module 302 may control the communication module 304 to switch the diversity reception either on or off (606).

In an embodiment, the diversity reception is switched on/off according to the quality-of-service (QoS) requirement of the application requesting the transfer of data. The diversity reception may be disabled for applications having a high QoS requirement and activated for applications having a low QoS requirement. A general QoS classification is divided into four categories: conversational, streaming, interactive, background. Conversational and streaming classes may be considered to require real-time data transfer, while interactive and background classes may be understood as non-real-time classes. In other words, the diversity reception may be disabled for conversational and streaming QoS classes and activated for interactive and background classes. In practice, the communication control module 302 may receive a data transfer request for a given application from the application module 300. At the same time, the application module 300 may inform the communication control module 302 about the QoS of the application, or the communication control module 302 may check the QoS of the application from the memory unit 306. Then, the communication control module 302 may compare the QoS of the application with a predetermined threshold QoS and determine, whether or not to use diversity reception for the application based on the comparison. In more detail, the communication control module 302 may determine to disable the diversity reception if the QoS requirement of the application is higher than the QoS threshold, and to activate the diversity reception, if the QoS requirement of the application is lower than the QoS threshold. Then, the communication control module 302 may control the communication module to either activate or disable the diversity reception on the basis of that determination.

In general, an application having high QoS requirements is provided with a communication channel (or connection) meeting these requirements. Moreover, the application having high QoS requirements is typically an application requiring continuous data transfer. Therefore, no additional benefit is achieved with the diversity reception. On the other hand, an application having low QoS requirements typically transfers data occasionally, and the data reception may be improved and, particularly, transfer duration may be reduced with the diversity reception.

The decision concerning the utilization of the diversity reception on the basis of the QoS requirements or QoS parameters of the application may be combined with the decision based on the radio channel type allocated to the application. Other factors may also be used to affect the decision on whether or not to utilize the diversity reception. The main purpose is to enable sufficient operation of the application, and secondarily to reduce the power consumption in the radio receiver. For example, the communication control unit 302 may activate or disable the diversity reception primarily according to the QoS requirement of the application and secondarily according to the power consumption of the radio receiver. In practice, the communication control unit 302 may determine the utilization of the diversity reception as described in Table 1 below. In other words, the communication control unit may switch the diversity reception on to ensure proper operation of the application even in a case where the reduced duration of the connection may not be achieved.

TABLE 1

| Possible to decrease duration? | QoS Requirement satisfied? | |
| --- | --- | --- |
| | Yes | No |
| Yes | Diversity on | Diversity on |
| No | Diversity off | Diversity on |

An alternative strategy for controlling the diversity reception is to activate or disable the diversity reception primarily according to the power consumption of the radio receiver and secondarily according to the QoS requirement of the application. This strategy illustrated in Table 2 below optimizes the power consumption of the radio receiver by activating the diversity reception whenever it is determined that the duration of the connection (or data transfer) may be decreased with the diversity reception. If it is determined that the duration of the connection (or data transfer) cannot be decreased with the diversity reception, the diversity reception is disabled.

TABLE 2

| Possible to decrease duration? | QoS Requirement satisfied? | |
| --- | --- | --- |
| | Yes | No |
| Yes | Diversity on | Diversity on |
| No | Diversity off | Diversity off |

Let us now consider a case where an application gaining from the diversity reception and an application not gaining from the diversity reception are running simultaneously. As a general rule, the diversity reception may be activated when an application gaining from the diversity reception is running regardless of the presence or number of running applications not benefiting from the diversity reception. Applications benefiting from the diversity reception may be categorized into non-real-time applications, applications utilizing determined (packet data) channels, low QoS applications, and/or high data rate applications. Applications not benefiting from the diversity reception may be categorized into real-time applications, applications utilizing determined (voice/streaming data) channels, high QoS applications, and/or low data rate applications. In a case where an application benefiting from the diversity reception is active while another application not gaining from the diversity reception is launched, the diversity reception may be kept switched on. In another case, where an application not benefiting from the diversity reception is active while another application gaining from the diversity reception is launched, the diversity reception may be switched on.

Figure 7:
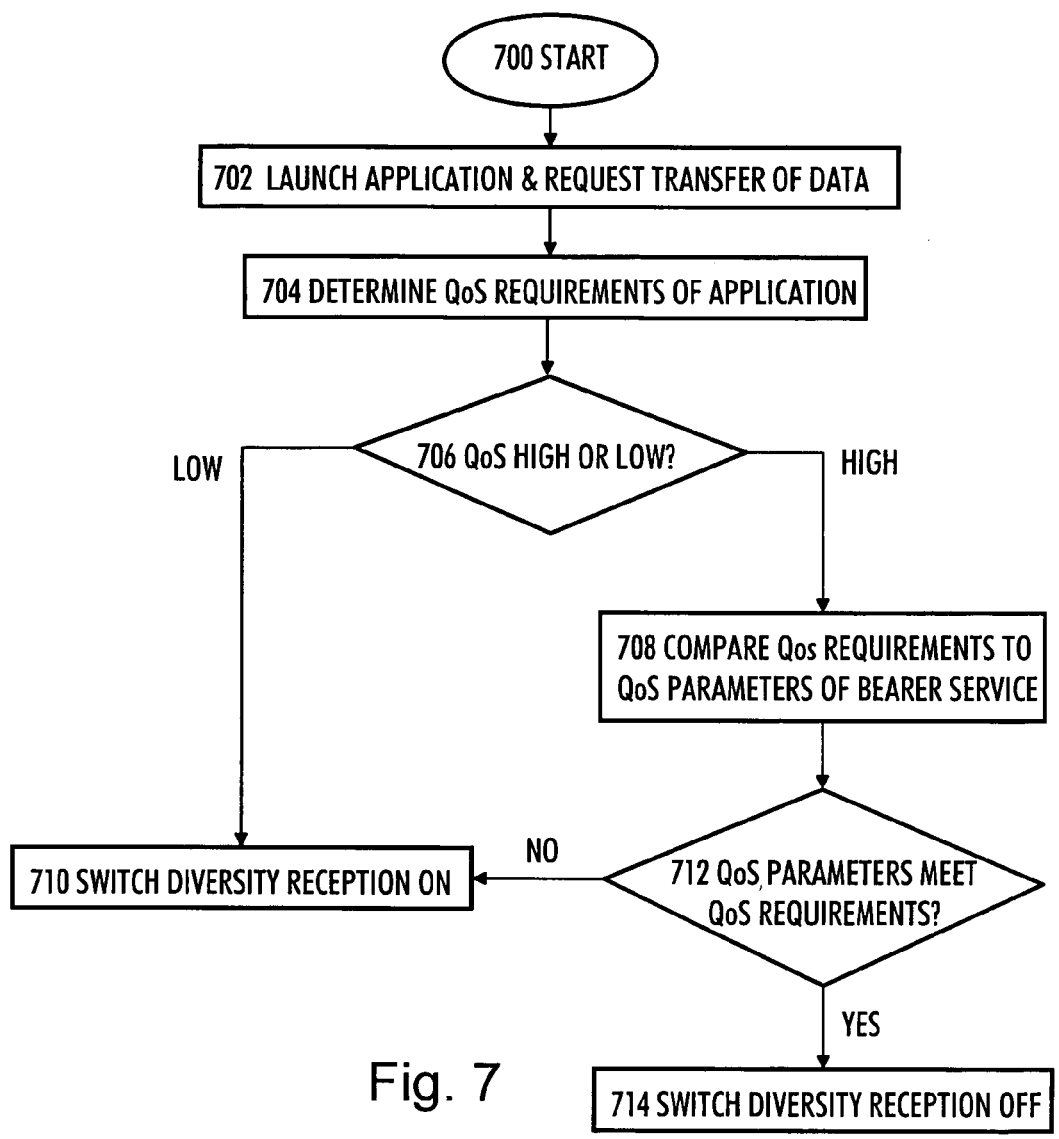
FIG. 7 is a flow diagram illustrating an embodiment of a process for controlling diversity reception according to still another embodiment of the invention.

FIG. 7 illustrates a flow diagram describing a procedure for controlling diversity reception according to this embodiment. The procedure starts in block 700. Referring to FIGS. 3 and 7, the application module 300 launches an application and requests transfer of data related to the application in block 702. The communication control unit 302 may first determine whether or not the application benefits from the utilization of the diversity reception. The communication control unit 302 may determine whether the QoS requirements of the application are high or low, i.e. above or below the QoS threshold (704 & 706). If the QoS requirements of the application are low, i.e. below the QoS threshold, the communication control unit 302 may switch the diversity reception on (710). On the other hand, if the QoS requirements of the application are high, i.e. above the QoS threshold, the communication control unit 302 may compare the QoS requirements of the application with the QoS parameters of a (radio) bearer service allocated to the application (708 & 712). If the QoS parameters of the bearer service meet the requirements of the application, or the QoS requirements cannot be met because of some other reason, the communication control unit 302 may switch the diversity reception off (714) in order to reduce the power consumption while ensuring sufficient operation of the application. In contrast, if the QoS parameters of the bearer service do not meet the requirements of the application, the communication control unit 302 may switch the diversity reception on (710) in order to ensure the sufficient operation of the application at the expense of increased power consumption.

In a yet another embodiment, the diversity reception may be activated/disabled according to the amount of data transferred for a given application within a determined time interval. The communication control unit 302 may be configured to monitor the amount of data transferred for a given application within a time window of a predetermined length, and to switch the diversity reception on/off on that basis. As an example, let us consider an e-mail application. The application requires a periodical transfer of a small amount of data in order to check from an e-mail server whether or not there are new e-mail messages for the user of the radio receiver running the e-mail application. The e-mail server then sends a response including information on whether or not there are new messages received at the server and possibly titles of the new e-mail messages. In case there are new e-mail messages, the user may instruct download of a certain new e-mail message, in which case the body of the message will be downloaded.

In general, an e-mail application is a non-real time (or background) application, and the diversity reception may be used generally for this type of application. In this embodiment, however, the diversity reception may be activated for downloading e-mail messages, for example, but it may be disabled for data transfer related to checking for new messages and receiving the response and message titles. In other words, the diversity reception may be disabled for small amounts of data transferred within the time window and activated for large amounts of data transferred within the time window.

Figure 8:
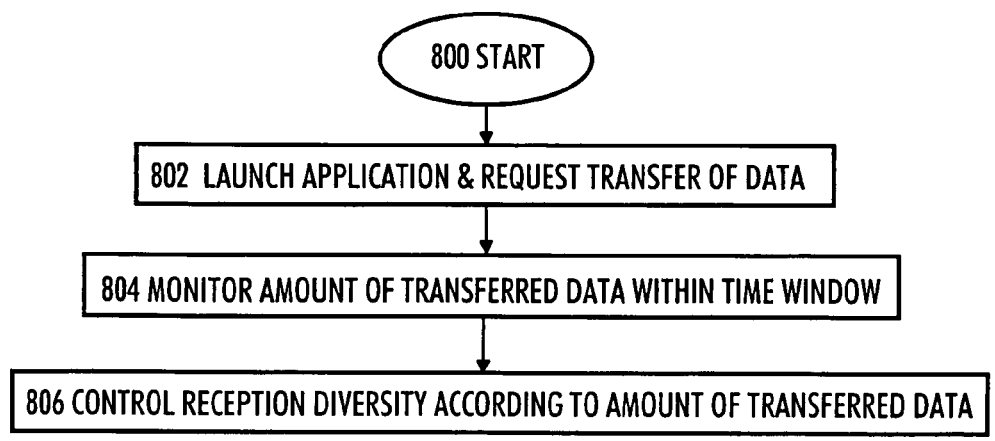
FIG. 8 is a flow diagram illustrating an embodiment of a process for controlling diversity reception according to yet another embodiment of the invention.

FIG. 8 illustrates a flow diagram describing a process for controlling the diversity reception according to this embodiment. The process starts in block 800. Referring to FIGS. 3 and 8, the application module 300 launches an application and requests transfer of data related to the application in block 802. The communication control unit 302 may monitor the amount of data transferred within the time window of a predetermined length (804), as described above. The communication control unit 302 may disable the diversity reception if the monitored amount of data is below a predetermined threshold, and activate the diversity reception if the monitored amount of data exceeds the predetermined threshold (806). The amount of data versus the length of the time window may be predefined in such a manner that the threshold is higher than the maximum amount of data transferred in relation to checking the e-mail server for new e-mail messages. The threshold may, however, be set low enough to enable diversity reception for the transfer of the contents of the new e-mail messages. In this example, the intelligent control of diversity reception reduces power consumption in relation to checking the server for new messages and ensures fast download but also reduced power consumption when downloading the message bodies. When transferring very small amounts of data periodically, e.g. simple automatic queries and answers, the diversity reception does not improve user experience but may increase power consumption. On the other hand, utilization of diversity reception for larger amounts of data not only improves user experience but may also reduce overall power consumption because of shorter duration the communication module 304 remains powered-up.

The processes or methods described in FIGS. 4 to 8 may also be carried out in the form of a computer process defined by a computer program. The computer program may be in a source code form, object code form, or in some intermediate form, and it may be stored in some sort of carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

The present invention is applicable to mobile terminals of mobile telecommunication systems defined above but also to other suitable telecommunication systems. The telecommunication system may have a fixed infrastructure providing wireless services to subscriber terminals, or it may be purely wireless mobile network, such as a wireless mobile ad-hoc network. The protocols used, the specifications of mobile telecommunication systems, their network elements and subscriber terminals, develop rapidly. Such development may require extra changes to an embodiment. Therefore, all words and expressions should be interpreted broadly and they are intended to illustrate, not to restrict, the embodiment.

It will be obvious to a person skilled in the art that, as technology advances, the inventive concept can be implemented in various ways. The invention and its embodiments are not limited to the examples described above but may vary within the scope of the claims.

The invention claimed is:

1. A method, comprising:
determining whether an application type of an application requesting for transfer of data is a real-time application or a non-real-time application; and
configuring a radio receiver to activate the diversity reception if the application type is determined to be the non-real-time application and to disable the diversity reception if the application type is determined to be the real-time application.

2. The method of claim 1, further comprising:
selecting a radio communication channel type for the application according to the application type, wherein the application utilizes a radio channel having the selected radio communication channel type in the transfer of data; and
configuring the radio receiver to either activate or disable diversity reception according to the radio communication channel type the application utilizes in the transfer of data.

3. The method of claim 2, further comprising:
disabling the diversity reception for dedicated traffic channels; and
activating the diversity reception for traffic channels other than dedicated traffic channels.

4. The method of claim 2, further comprising:
disabling the diversity reception for communication channels carrying conversational data or streaming data; and
activating the diversity reception for communication channels carrying packet data other than conversational data or streaming data.

5. The method of claim 2, further comprising:
disabling the diversity reception if the radio communication channel type has a fixed data rate; and
activating the diversity reception if the radio communication channel type has a variable data rate.

6. The method of claim 1, further comprising:
using the diversity reception when running at least one application for which the diversity reception is determined to be used, regardless of a number of running applications, for which the diversity reception is determined not to be used.

7. The method of claim 1, further comprising:
disabling the diversity reception when running at least one application for which the diversity reception is determined not to be used, regardless of a number of running applications, for which the diversity reception is determined to be used.

8. The method of claim 1, further comprising:
configuring the radio receiver to either activate or disable the diversity reception according to a quality-of-service requirement of the application.

9. The method of claim 8, further comprising:
activating the diversity reception if the quality-of-service requirement of the application is lower than a predetermined quality-of-service threshold; and
disabling the diversity reception if the quality-of-service requirement of the application is higher than the predetermined quality-of-service threshold.

10. The method of claim 8, further comprising:
activating or disabling the diversity reception primarily according to the quality-of-service requirement of the application and secondarily according to a power consumption of the radio receiver.

11. The method of claim 1, further comprising:
monitoring an amount of the data transferred in relation to the application within a determined time period;
comparing the monitored amount of data transferred within the determined time period with a predetermined threshold;
activating the diversity reception when the monitored amount of data transferred exceeds the predetermined threshold; and
disabling the diversity reception when the monitored amount of data transferred is below the predetermined threshold.

12. An apparatus comprising:
at least one processor; and
at least one memory including computer program code,
the at least one memory and the computer program code configured, with the at least one processor, to cause the apparatus to determine whether an application type of an application requesting for transfer of data is a real-time application or a non-real-time application, to control a radio receiver to activate the diversity reception if the application type is determined to be the non-real-time application, and to disable the diversity reception if the application type is determined to be the real-time application.

13. The apparatus of claim 12, wherein the at least one memory and the computer program code are further configured, with the at least one processor, to select a radio communication channel type for the application according to the application type, wherein the application is configured to utilize a radio channel having the selected radio communication channel type in transfer of data, and to configure the radio receiver to either activate or disable the diversity reception according to the radio communication channel type the application utilizes in the transfer of data.

14. The apparatus of claim 13, wherein the at least one memory and the computer program code are further configured, with the at least one processor, to disable the diversity reception for dedicated traffic channels and to activate the diversity reception for traffic channels other than the dedicated traffic channels.

15. The apparatus of claim 13, wherein the at least one memory and the computer program code are further configured, with the at least one processor, to disable the diversity reception for communication channels carrying conversational data or streaming data and to activate the diversity reception for communication channels carrying packet data other than conversational data or streaming data.

16. The apparatus of claim 13, wherein the at least one memory and the computer program code are further configured, with the at least one processor, to disable the diversity reception if the radio communication channel type has a fixed data rate, and to activate the diversity reception if the radio communication channel type has a variable data rate.

17. The apparatus of claim 12, wherein the at least one memory and the computer program code are further configured, with the at least one processor, to use the diversity reception when running at least one application for which the diversity reception is determined to be used, regardless of a number of running applications for which the diversity reception is determined not to be used.

18. The apparatus of claim 12, wherein the at least one memory and the computer program code are further configured, with the at least one processor, to disable the diversity reception when running at least one application for which the diversity reception is determined not to be used, regardless of a number of running applications for which the diversity reception is determined to be used.

19. The apparatus of claim 12, wherein the at least one memory and the computer program code are further configured, with the at least one processor, to configure the radio receiver to either activate or disable the diversity reception according to a quality-of-service requirement of the application.

20. The apparatus of claim 19, wherein the at least one memory and the computer program code are further configured, with the at least one processor, to activate the diversity reception if the quality-of-service requirement of the application is lower than a predetermined quality-of-service threshold, and to disable the diversity reception if the quality-of-service requirement of the application is higher than the predetermined quality-of-service threshold.

21. The apparatus of claim 19, wherein the at least one memory and the computer program code are further configured, with the at least one processor, to activate or disable the diversity reception primarily according to the quality-of-service requirement of the application and secondarily according to a power consumption of the radio receiver.

22. The apparatus of claim 12, wherein the at least one memory and the computer program code are further configured, with the at least one processor, to monitor an amount of the data transferred in relation to the application within a determined time period, to compare the monitored amount of data transferred within the determined time period with a predetermined threshold, to activate the diversity reception when the monitored amount of data transferred exceeds the predetermined threshold, and to disable the diversity reception when the monitored amount of data transferred is below the predetermined threshold.

23. An apparatus, comprising:
means for determining whether an application type of an application requesting for transfer of data is a real-time application or a non-real-time application; and
means for configuring a radio receiver to activate the diversity reception if the application type is determined to be the non-real-time application and to disable the diversity reception if the application type is determined to be the real-time application.

24. A computer program product embodied on a distribution medium readable by a computer and comprising program instructions which, when loaded into the computer, cause the computer to execute a computer process comprising:
determining whether an application type of an application requesting for transfer of data is a real-time application or a non-real-time application; and
configuring a radio receiver to activate the diversity reception if the application type is determined to be the non-real-time application and to disable the diversity reception if the application type is determined to be the real-time application.

* * * * *